United States Patent
Lee et al.

(10) Patent No.: US 11,868,673 B2
(45) Date of Patent: Jan. 9, 2024

(54) WIRELESS DEVICE USING A MIRRORING REQUEST FOR A SCREEN SHARING DEVICE

(71) Applicant: LG ELECTRONICS INC., Seoul (KR)

(72) Inventors: Eunjung Lee, Seoul (KR); Taejin Park, Seoul (KR); Jinseong Kim, Seoul (KR); Kyungnam Bae, Seoul (KR); Byounghyun Shin, Seoul (KR); Jeonghwan Kwon, Seoul (KR)

(73) Assignee: LG ELECTRONICS, INC, Seoul (KR)

( * ) Notice: Subject to any disclaimer, the term of this patent is extended or adjusted under 35 U.S.C. 154(b) by 433 days.

(21) Appl. No.: 17/008,232

(22) Filed: Aug. 31, 2020

(65) Prior Publication Data
US 2021/0334060 A1    Oct. 28, 2021

(30) Foreign Application Priority Data

Apr. 22, 2020 (KR) .................. 10-2020-0048610

(51) Int. Cl.
| | | |
|---|---|---|
| H04L 29/06 | (2006.01) |
| G06F 3/14 | (2006.01) |
| H04W 76/10 | (2018.01) |
| H04W 12/033 | (2021.01) |
| H04L 9/30 | (2006.01) |
| H04W 12/06 | (2021.01) |

(52) U.S. Cl.
CPC ............ *G06F 3/1454* (2013.01); *H04L 9/30* (2013.01); *H04W 12/033* (2021.01); *H04W 12/06* (2013.01); *H04W 76/10* (2018.02)

(58) Field of Classification Search
None
See application file for complete search history.

(56) References Cited

U.S. PATENT DOCUMENTS

| | | | |
|---|---|---|---|
| 2010/0008504 A1 | 1/2010 | Nagara | |
| 2010/0174599 A1* | 7/2010 | Rosenblatt ......... | G06Q 30/0641 |
| | | | 705/14.37 |
| 2012/0079551 A1 | 3/2012 | Isozaki et al. | |
| 2014/0325554 A1 | 10/2014 | Park et al. | |

(Continued)

OTHER PUBLICATIONS

Singh, Varsha; Singh, Devi. Smart Interactive Mirror Display. 2019 International Conference on Machine Learning, Big Data, Cloud and Parallel Computing (COMITCon). https://ieeexplore.ieee.org/stamp/stamp.jsp?tp=&arnumber=8862180 (Year: 2019).*

(Continued)

*Primary Examiner* — Jeremiah L Avery
(74) *Attorney, Agent, or Firm* — LEE, HONG, DEGERMAN, KANG & WAIMEY

(57) ABSTRACT

A wireless device according to an embodiment of the present disclosure may receive a mirroring request for a screen sharing service from an external device, may determine whether a transmission condition of a content image is satisfied according to the received mirroring request, and, when the transmission condition is satisfied, to transmit content image data corresponding to the content image and OSD image data corresponding to an OSD image to the external device through a wireless communication interface.

14 Claims, 8 Drawing Sheets

(56) References Cited

U.S. PATENT DOCUMENTS

| | | | |
|---|---|---|---|
| 2016/0165056 A1* | 6/2016 | Bargetzi | G06F 3/1454 |
| | | | 455/416 |
| 2016/0239250 A1 | 8/2016 | Kim et al. | |
| 2017/0104928 A1* | 4/2017 | Chase | H04N 5/77 |
| 2018/0070122 A1 | 3/2018 | Baek et al. | |
| 2018/0129615 A1 | 5/2018 | Park et al. | |
| 2018/0205983 A1 | 7/2018 | Lee et al. | |
| 2018/0263028 A1 | 9/2018 | Iwami | |
| 2018/0341453 A1 | 11/2018 | Nakagawa | |
| 2019/0212848 A1 | 7/2019 | Lee et al. | |
| 2020/0264908 A1* | 8/2020 | Utsch | H04W 4/06 |
| 2020/0333994 A1* | 10/2020 | Sepulveda | G06F 3/04847 |

OTHER PUBLICATIONS

Sitorus, Yacob W. et al. Establishment of Wi-Fi Display session between source and sink device in wireless Android screencasting. 2015 International Symposium on Intelligent Signal Processing and Communication Systems (ISPACS). https://ieeexplore.ieee.org/stamp/stamp.jsp?tp=&arnumber=7432854 (Year: 2015).*

Georgiadis, Pantellis et al. PDA-based system with teleradiology and image analysis capabilities. 2007 29th Annual International Conference of the IEEE Engineering in Medicine and Biology Society. https://ieeexplore.ieee.org/stamp/stamp.jsp?tp=&arnumber=4352981 (Year: 2007).*

European Patent Office Application Serial No. 20189815.2, Search Report dated Oct. 20, 2020, 10 pages.

European Patent Office Application Serial No. 20189815.2, Office Action dated Aug. 17, 2023, 4 pages.

* cited by examiner

WIRELESS DEVICE USING A MIRRORING REQUEST FOR A SCREEN SHARING DEVICE

CROSS-REFERENCE TO RELATED APPLICATIONS

Pursuant to 35 U.S.C. § 119(a), this application claims the benefit of earlier filing date and right of priority to Korean Patent Application No. 10-2020-0048610, filed on Apr. 22, 2020, the contents of which are all hereby incorporated by reference herein in its entirety.

FIELD

The present disclosure relates to a wireless device, and more particularly, to a wireless device which provides a screen sharing service.

BACKGROUND

Screen mirroring technology refers to technology for sharing a screen between devices.

For screen mirroring, two devices share a screen using any one of a peer-to-peer (P2P) connection mode using P2P without a router and an access point (AP) connection mode using a router.

In the case of the P2P connection mode, after device search through P2P scan, a request for connection to the searched device, P2P connection and real time streaming protocol (RTSP) connection, a mirroring image is displayed on a sink device.

TVs are typically placed in living rooms which are family sharing living spaces, and there is a need for viewing TVs in other living spaces such as kitchens, rooms, etc.

However, since an operation for controlling a TV through a remote control device (a remote controller, etc.) is not finely performed, UIs of the TV become complicated, and accordingly, required user input convenience may not be satisfied.

SUMMARY

An object of the present disclosure is to enable a user to control a source device while viewing an image received from the source device.

Another object of the present disclosure is to enhance convenience of inputting to operate a source device.

A wireless device according to an embodiment of the present disclosure may receive a mirroring request for a screen sharing service from an external device, may determine whether a transmission condition of a content image is satisfied according to the received mirroring request, and, when the transmission condition is satisfied, may transmit content image data corresponding to the content image and OSD image data corresponding to an OSD image to the external device through a wireless communication interface.

A wireless device according to an embodiment of the present disclosure may transmit a mirroring request for a screen sharing service to an external device, may determine whether a transmission condition of a content image is satisfied, may receive content image data corresponding to the content image and OSD image data corresponding to an OSD image from the external device through a wireless communication interface when the transmission condition is satisfied, and may display a content mirroring image on the basis of the content image data and may display an OSD mirroring image on the basis of the OSD image data on the display.

According to various embodiments of the present disclosure, a user can control a source device while viewing a content image being displayed by the source device through a sink device.

In addition, a user can easily control a source device only by a simple touch input through a sink device, such that input convenience can be greatly enhanced.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION

Figure 1:
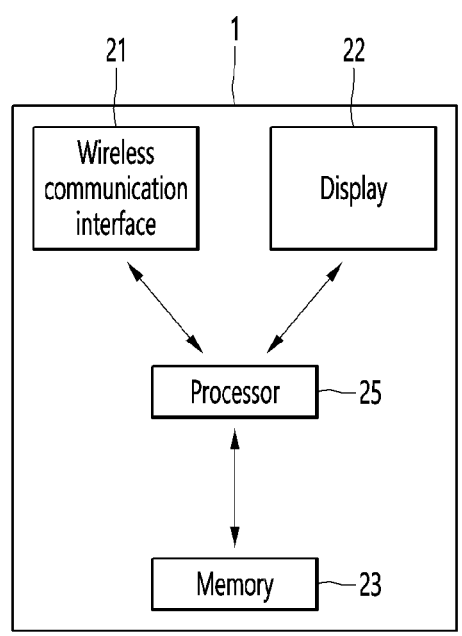
FIG. 1 is a view illustrating the configuration of a wireless device according to an embodiment of the present disclosure.

FIG. 1 is a view illustrating the configuration of a wireless device according to an embodiment of the present disclosure.

The wireless device 1 described below may be any one of a TV, a smartphone, a tablet PC, a navigation system, a wearable device and a PC.

The wireless device 1 shown in FIG. 1 may be any one of a source device 10 and a sink device 20, both of which will be described below.

Referring to FIG. 1. the wireless device 1 may include a wireless communication interface 21, a display 22, a memory 23 and a processor 25.

The wireless communication interface 21 may transmit/ receive a wireless signal and, for example, implement a physical layer according to an IEEE 802 system. The wireless communication interface 21 may be referred to as a transceiver.

The wireless communication interface 21 may perform communication with an external device through wireless communication. The wireless communication interface 21 may perform short range communication with an external device.

To this end, the wireless communication interface 21 may support short range communication using at least one of Bluetooth™, RFID (Radio Frequency Identification), Infrared Data Association (IrDA), UWB (Ultra Wideband), ZigBee, NFC (Near Field Communication), Wi-Fi (Wireless-Fidelity), Wi-Fi Direct or Wireless USB (Wireless Universal Serial Bus) technology.

The display 22 may generate a driving signal by converting an image signal, a data signal or an OSD signal processed by the processor 25 or an image signal or a data signal received through the wireless communication interface 21 into R, G and B signals.

The processor 25 may control operation of the wireless communication interface 21, the memory 23 and the display 22.

The processor 25 may be electrically connected to the wireless communication interface 21 to implement a physical layer and/or an MAC layer according to the IEEE 802 system.

In addition, the processor 25 may be configured to perform operation of encoding and decoding audio/video for a WFD (Wi-Fi Direct) service.

The memory 23 may be included in the processor 25 or may be installed outside the processor 25 and may be connected with the processor 25 by a well-known unit. Although not shown, the wireless device 1 may further include a sound output unit for outputting sound.

Figure 2:
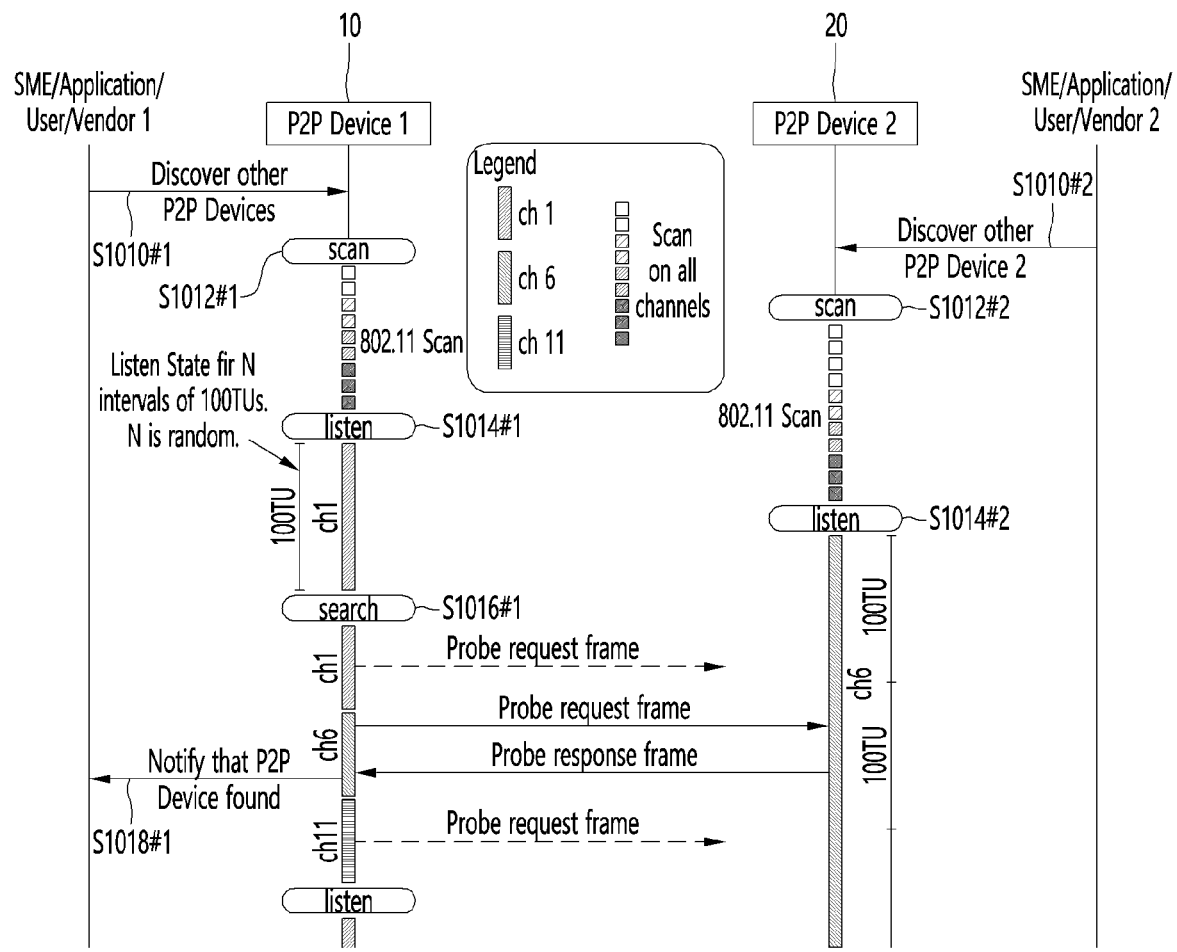
FIG. 2 is a view illustrating the flow of a device discovery process according to an embodiment of the present disclosure.

FIG. 2 is a view illustrating the flow of a device discovery process according to an embodiment of the present disclosure.

Particularly, FIG. 2 shows the flow of a discovery process between devices in a peer-to-peer (P2P) connection mode between P2P Device 1 10 and P2P Device 2 20.

P2P Device 1 10 may be referred to as a source device and P2P Device 2 20 may be referred to as a sink device.

Referring to FIG. 2, the neighbor discovery process of FIG. 2 may start by an instruction of a station management entity (SME)/application/user/vendor (S1010), and may be divided into a scan phase S1012 and find phases S1014 to S1016.

The scan phase S1012 includes operation of scanning all available wireless channels according to an 802.11 method. Therefore, the P2P device may confirm the best operation channel.

The find phases S1014 to S1016 include a listen mode S1014 and a search mode S1016, and the P2P device alternately repeats the listen mode S1014 and the search mode S1016.

The P2P devices 10 and 20 may perform active search using a probe request frame in the search mode S1016 and limits the search range to social channels such as channels 1, 6 and 11 (2412, 2437 and 2462 MHz) for fast search.

In addition, the P2P devices 302 and 304 are maintained in a reception state by selecting only one of three social channels in the listen mode S1014.

At this time, when a probe request frame transmitted by another P2P device (e.g., 10) in the search mode is received, the P2P device (e.g., 20) responds with a probe response frame.

The time of the listen mode S1014 may be randomly given (e.g., 100, 200, 300 TU (Time Unit) msec). The P2P devices may continuously repeat the search mode and the reception mode to reach a common channel. The P2P device may discover another P2P device and then find/exchange a device type, a manufacturer or a familiar device name using a probe request frame and a probe response frame, in order to be selectively coupled to the P2P device.

When a neighbor P2P device is discovered through a neighbor discovery process and necessary information is obtained, the P2P device (e.g., 10) may notify the SME/application/user/vendor of P2P device discovery (S1018).

After the device discovery process, the P2P devices 10 and 20 establish P2P connection and then perform a screen mirroring function through a Real Time Streaming Protocol (RTSP).

P2P Device 1 10 is a source device which transmits image data to P2P device 2 20 which is a sink device, and P2P Device 2 20 displays a mirroring image based on the received image data.

However, in a P2P connection mode, it takes a considerable time to perform a device search process through P2P scan, and the search time significantly varies according to the surrounding wireless environment.

Figure 3:
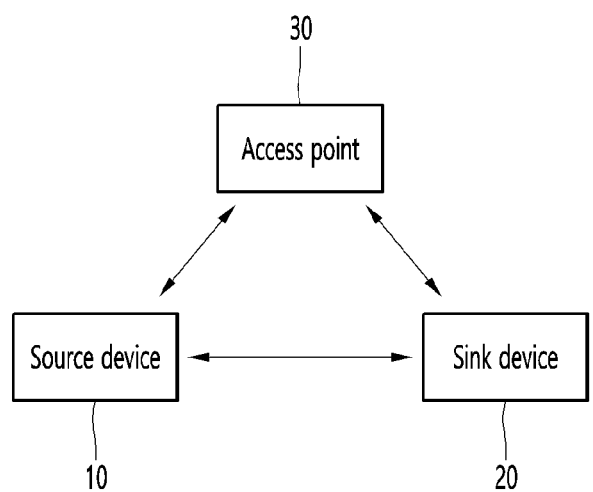
FIG. 3 is a view illustrating an access point (AP) connection mode which is a connection method between devices through an access point.

FIG. 3 is a view illustrating an access point (AP) connection mode which is a connection method between devices through an access point.

The AP connection mode may refer to a mode in which the source device 10 and the sink device 20 are connected through an access point 30 (router).

That is, the P2P connection mode may refer to a mode in which the source device 10 and the sink device 20 are directly connected without the access point 30, and the AP connection mode may be refer to a mode in which the source device 10 and the sink device 20 are connected through the access point 30 as an intermediary.

In the AP connection mode, a screen mirroring function between the source device 10 and the sink device 20 may be performed through the access point 30. That is, the source device 10 may transmit the image data of the displayed image to the sink device 20 through the access point 30.

Hereinafter, the source device 10 may display a content image and an on screen display (OSD) image.

Figure 4:
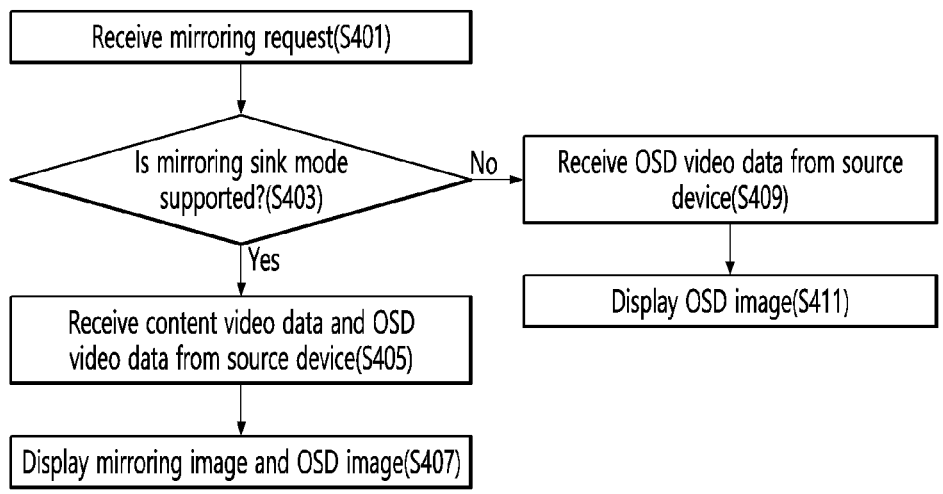
FIG. 4 is a flowchart to explain an operating method of a sink device according to an embodiment of the present disclosure.

FIG. 4 is a flowchart to explain an operating method of the sink device according to an embodiment of the present disclosure.

Referring to FIG. 4, the processor 25 of the sink device 20 receives a mirroring request (S401).

In an embodiment, the mirroring request may be a request for providing a screen sharing service with the source device 10. The mirroring request may be a request for displaying a mirroring image on the basis of image data received from the source device 10.

The processor 25 may receive the mirroring request on a menu screen for controlling the source device 10.

The processor 25 of the sink device 20 determines whether the sink device 20 supports a mirroring sink mode (S403).

The sink device 20 may operate in any one mirroring mode of a mirroring source mode or a mirroring sink mode.

The mirroring source mode may be a mode in which the sink device 20 operates as a transmission entity to transmit image data corresponding to a displayed image, and the mirroring sink mode may be a mode in which the sink device 20 operates as a reception entity to receive image data from the source device 10 and to display a mirroring image.

The sink device 20 may determine whether the sink device supports the mirroring sink mode, on the basis of device information indicating whether the sink device 20 supports the mirroring sink mode.

When the sink device 20 supports the mirroring sink mode, the processor 25 of the sink device 20 receives content video data and OSD video data from the source device 10 through the wireless communication interface 21 (S405).

The content video data may be data corresponding to the content image which is being displayed by the source device 10.

The OSD video data may be data corresponding to an OSD menu which is displayed along with the content image by the source device 10.

When the sink device 20 supports the mirroring sink mode, the processor 25 of the sink device 20 may request the source device 10 to transmit the content video data and the OSD video data.

In another example, when the source device 10 determines that the sink device 20 supports the mirror sink mode on the basis of device information of the sink device 20, the source device 10 may transmit the content video data and the OSD video data to the sink device 20.

The content video data may be data that is encrypted through a well-known encryption algorithm.

The processor 25 of the sink device 20 may display a mirroring image and an OSD image on the display 22, on the basis of the received content video data and OSD video data (S407).

The processor 25 may display the mirroring image on the basis of the content video data, and may display the OSD image on the basis of the OSD video data.

The mirroring image and the OSD image may be displayed, overlapping each other on the display 22.

The processor 25 may decrypt the encrypted content video data, and may output the mirroring image to the display 22 on the basis of the decrypted content video data.

On the other hand, when the processor 25 of the sink device 20 determines that the sink device 20 does not support the mirroring sink mode, the processor 25 receives only the OSD video data from the source device 10 through the wireless communication interface 21 (S409).

When the processor 25 determines that the sink device 20 does not support the mirroring sink mode on the basis of device information, the processor 25 may receive only the OSD video data from the source device 10.

That is, when the processor 25 determines that the sink device 20 does not support the mirroring sink mode, the processor 25 may transmit a request to transmit only the OSD video data to the source device 20.

In another example, when the source device 10 determines that the sink device 20 does not support the mirroring sink mode on the basis of information of the sink device 20, the source device 10 may transmit only the OSD video data to the sink device 20.

The processor 25 of the sink device 20 displays the OSD image on the display 22 on the basis of the received OSD video data (S411).

That is, the processor 25 of the sink device 20 may not display the mirroring image and may display only the OSD image on the display 22.

Figure 5:
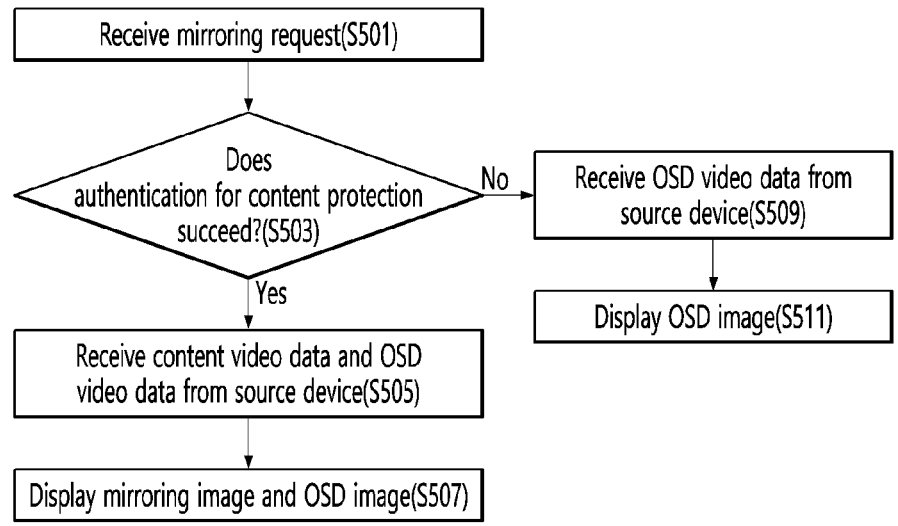
FIG. 5 is a flowchart to explain an operating method of the sink device according to another embodiment of the present disclosure.

FIG. 5 is a flowchart to explain an operating method of the sink device according to another embodiment of the present disclosure.

In the embodiment of FIG. 5, a detailed description of the same portions as in FIG. 4 will be omitted.

Referring to FIG. 5, the processor 25 of the sink device 20 receives a mirroring request (S501).

The processor 25 of the sink device 20 determines whether authentication for content protection succeeds (S503).

The content protection may indicate protection of a copyright of a digital image.

The content protection may apply high-bandwidth digital content protection (HDCP) 1 standard or HDCP 2 standard.

The HDCP standards refer to copyright protection technology that encrypts a transmission path of a content image between devices, and prevents a copy of the content.

In a process of connecting with the source device 10, the processor 25 of the sink device 20 may determine whether a protection condition is imposed on a content image displayed by the source device 10, by exchanging information. The exchanged information may include a message indicating whether the content protection condition is imposed on the content image.

The message may be an encrypted message. The message may be generated by encrypting a security key generated by a public key, a private key of each device.

When the encrypted message received from the source key 10 is the same as a message generated by the sink device 20, the processor 25 of the sink device 20 may determine that the authentication for the content protection succeeds.

When the encrypted message received from the source device 10 is not the same as the message generated by the sink device 20, the processor 25 of the sink device 20 may determine that the authentication for the content protection fails.

When the authentication for the content protection succeeds, the processor 25 of the sink device 20 receives content video data and OSD video data from the source device 10 through the wireless communication interface 21 (S505).

The content video data may be data that corresponds to a content image being displayed by the source device 10.

The content video data may be encrypted data.

The OSD video data may be data corresponding to an OSD menu which is displayed along with the content image by the source device 10.

The processor 25 of the sink device 20 displays a mirroring image and an OSD image on the display 22 on the basis of the received video content data and OSD video data (S507).

The processor 25 may display the mirroring image on the basis of the content video data, and may display the OSD image on the basis of the OSD video data.

The mirroring image and the OSD image may be displayed, overlapping each other on the display 22.

On the other hand, when it is determined that the authentication for the content protection fails, the processor 25 of the sink device 20 receives only the OSD video data from the source device 10 through the wireless communication interface 21 (S509).

The processor 25 of the sink device 20 displays the OSD image on the display 22 on the basis of the received OSD video data (S511).

That is, the processor 25 of the sink device 20 may not display the mirroring image, and may display only the OSD image on the display 22.

According to another embodiment of the present disclosure, the sink device 20 may receive the content video data and the OSD video data from the source device 10 only when the sink device 20 supports the mirroring sink mode and the authentication for the content protection succeeds.

That is, only when the two conditions described above are satisfied simultaneously, the sink device 20 may receive the content video data and the OSD video data, simultaneously, from the source device 10.

Figure 6:
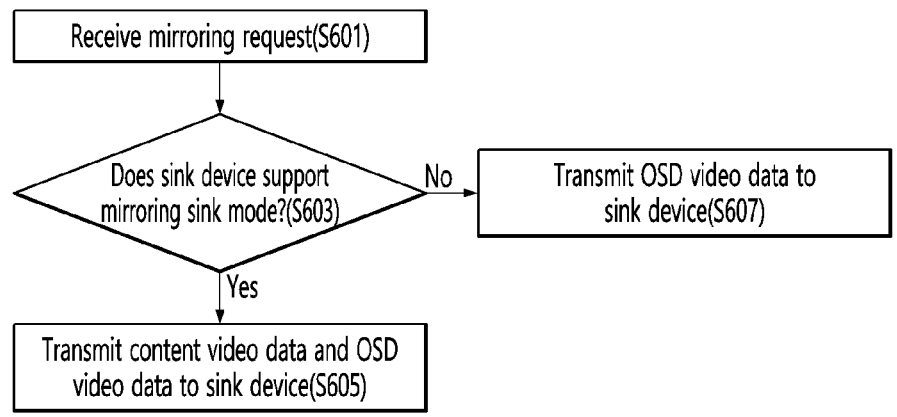
FIG. 6 is a flowchart to explain an operating method of a source device according to an embodiment of the present disclosure.

Next, FIG. 6 is a flowchart to explain an operating method of the source device according to an embodiment of the present disclosure.

The processor 25 of the source device 10 receives a mirroring request from the sink device 20 through the wireless communication interface 21 (S601).

In an embodiment, the processor 25 of the source device 10 may receive a mirroring request for requesting a screen sharing service from the sink device 20. The sink device 20 may transmit the mirroring request to the source device 10 when a mirroring button is selected on a menu screen for controlling the source device 10 through a user input.

The processor 25 of the source device 10 determines whether the sink device 20 supports the mirroring sink mode (603).

The processor 25 of the source device 10 may determine whether the sink device 20 supports the mirroring sink mode, on the basis of information of the sink device 20 included in the mirroring request.

The information of the sink device 20 may include identification information of the sink device 20, and sink identification information indicating whether the sink device 20 supports mirroring.

The processor 25 of the source device 10 may determine whether the sink device 20 supports the mirroring sink mode by using the sink identification information.

When the processor 25 of the source device 10 determines that the sink device 20 supports the mirroring sink mode, the processor 25 transmits, to the sink device 20, content video data corresponding to a content image being displayed by the source device 10, and OSD video data corresponding to an OSD image (S605).

When the sink device 20 supports the mirroring sink mode, the processor 25 of the source device 10 may encrypt the content video data corresponding to the content image being displayed on the display 22 of the source device 10, and may transmit the encrypted content video data and the OSD video data to the sink device 20.

In this case, the sink device 20 may decrypt the encrypted content video data, and may display the decrypted content video data along with the OSD video data.

In another embodiment, the processor 25 of the source device 10 may encrypt all of the content video data and the OSD video data, and may transmit the encrypted data to the sink device 20.

The sink device 20 may decrypt the encrypted content video data and the encrypted OSD video data, respectively, and may display the decrypted video data, respectively.

When it is determined that the sink device 20 does not support the mirroring sink mode, the processor 25 of the source device 10 transmits the OSD video data corresponding to the OSD image to the sink device 20 (S607).

When the sink device 20 does not support the mirroring sink mode, the processor 25 of the source device 10 may transmit only the OSD video data corresponding to the OSD image being displayed by the source device 10 to the sink device 20.

Figure 7:
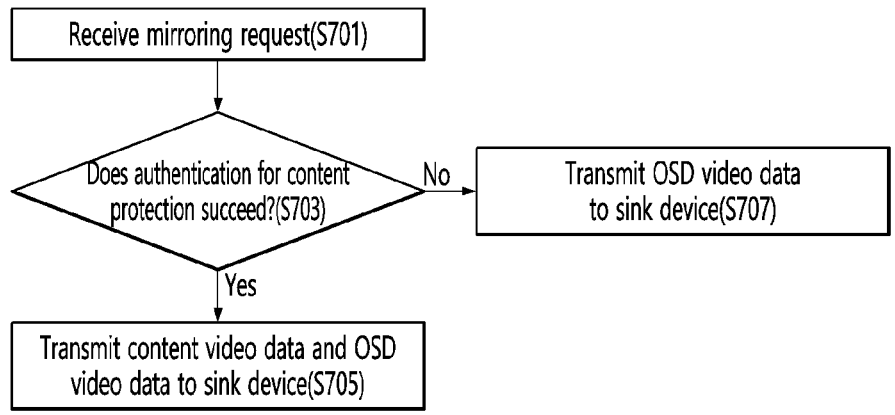
FIG. 7 is a flowchart to explain an operating method of the source device according to another embodiment of the present disclosure.

FIG. 7 is a flowchart to explain an operating method of the source device according to another embodiment of the present disclosure.

Referring to FIG. 7, the processor 25 of the source device 10 receives a mirroring request (S701).

The processor 25 of the source device 10 may receive a mirroring request for requesting a screen sharing service from the sink device 20. The sink device 20 may transmit the mirroring request to the source device 10 when a mirroring button is selected on a menu screen for controlling the source device 10 through a user input.

The processor 25 of the source device 10 determines whether authentication for content protection regarding a content image being displayed by the source device 10 succeeds (S703).

The content protection is the same as described in FIG. 5.

The processor 25 of the source device 10 may receive an encrypted first message from the sink device 20, and may determine whether the received first message is the same as a second message generated by the source device 10.

The first message may be included in the mirroring request, but this is merely an example and the first message may be separately received.

The first message may be a message that is obtained by encrypting a first security key generated by using a public key of the source device 10, a public key of the sink device 20, and a private key of the sink device 20.

The second message may be a message that is obtained by encrypting a second security key generated by using the public key of the source device 10, the public key of the sink device 20, and the private key of the source device 10.

When the first message and the second message are the same as each other, the processor 25 of the source device 10 may determine that the authentication for the content protection succeeds.

When the first message and the second message are not the same as each other, the processor 25 of the source device 10 may determine that the authentication for the content protection fails.

When the authentication for the content protection succeeds, the processor 25 of the source device 10 transmits content video data and OSD video data to the sink device 20 through the wireless communication interface 21 (S705).

The content video data may be data corresponding to a content image being displayed by the source device 10.

The content video data may be encrypted data.

The OSD video data may be data corresponding to an OSD menu which is displayed along with the content image by the source device 10.

When the authentication for the content protection fails, the processor 25 of the source device 10 transmits the OSD video data to the sink device 20 through the wireless communication interface 21 (S707).

That is, the processor 25 of the source device 10 may transmit only the OSD video data to the sink device 20 for the sake of protecting the copyright of the content.

In another embodiment, when the sink device 20 supports the mirroring sink mode and the authentication for the content protection succeeds, the source device 10 may transmit the content video data to the sink device 20.

That is, only when the two conditions described above are satisfied simultaneously, the source device 10 may transmit the content video data and the OSD video data to the sink device 20, simultaneously.

Figure 8:
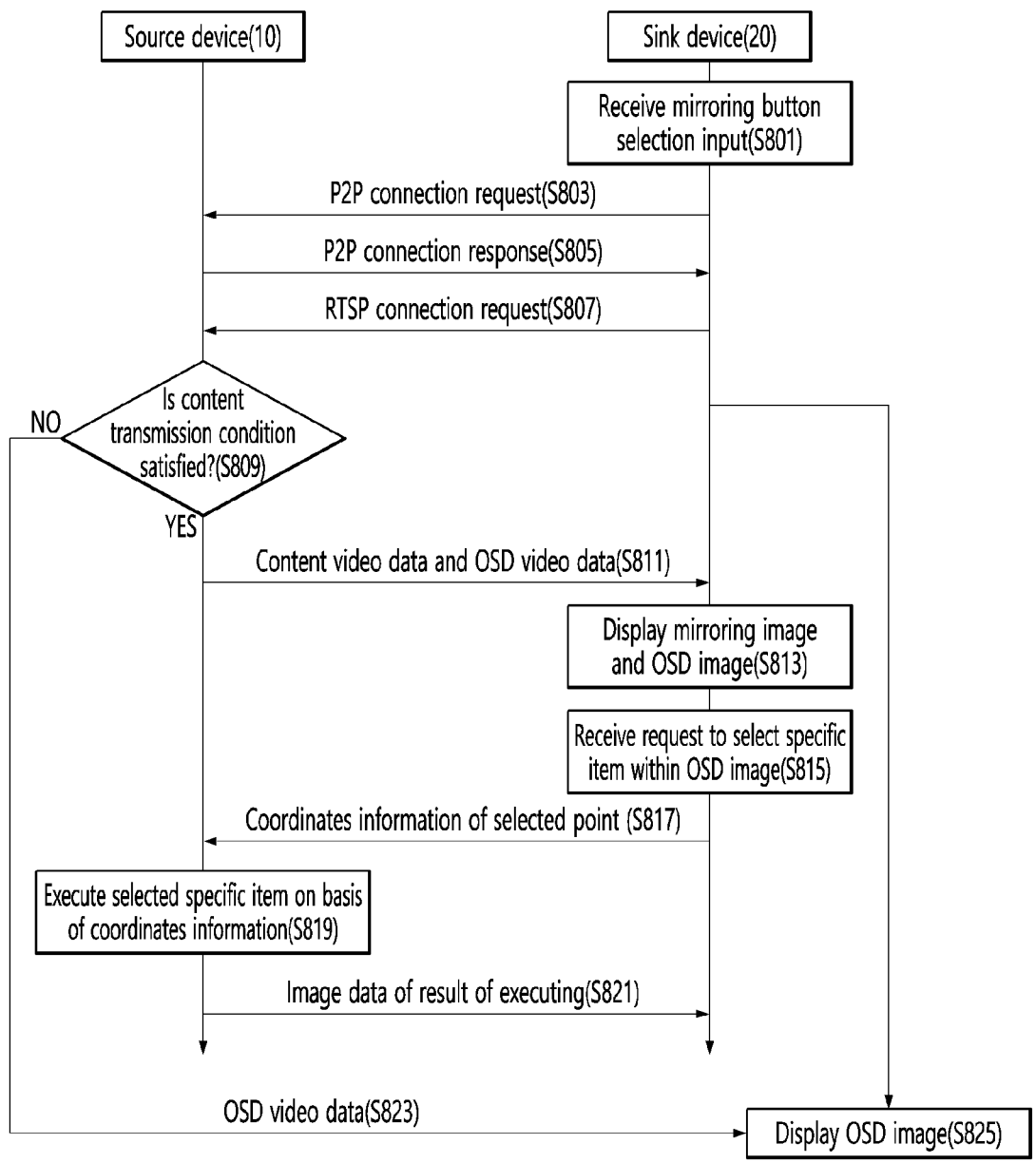
FIG. 8 is a view illustrating an example of providing a screen sharing service through a P2P connection mode between the source device and the sink device according to an embodiment of the present disclosure.

FIG. 8 is a view to explain an example of providing a screen sharing service through a P2P connection mode between the source device and the sink device according to an embodiment of the present disclosure.

That is, FIG. 8 illustrates that a screen sharing service is provided under a P2P connection mode in which the source device 10 and the sink device 20 are connected to each other without a router.

In FIG. 8, the sink device 20 may discover the source device 10 which exists on the same network through a ThinkQ application for controlling an external device. The discovered source device and a mirroring button, which will be described below, may be displayed on an execution screen of the ThinkQ application.

Referring to FIG. 8, the sink device 20 receives a mirroring button selection input (S801).

The mirroring button may be a button which is displayed on the display 22 of the sink device 20 to provide a screen mirroring service.

In response to the mirroring button selection input, the sink device 20 transmits a P2P connection request to the source device 10 (S803).

The P2P connection request may be an operation that is performed after the device discovery process of FIG. 2.

The P2P connection request may be a request to enter the P2P connection mode.

The source device 10 transmits a P2P connection response to the sink device 20 in response to the P2P connection request received from the sink device 20 (S805).

Thereafter, the source device 10 receives an RTSP connection request from the sink device 20 (S807).

Thereafter, the source device 10 determines whether a content transmission condition is satisfied (S809).

In an embodiment, the content transmission condition may include one or more of a condition where the sink device 20 supports the mirroring sink mode, and a condition where authentication for protection of a content being displayed by the source device 10 succeeds.

The source device 10 may determine when the content transmission condition is satisfied when the sink device 20 supports the mirroring sink mode.

The source device 10 may determine whether the sink device 20 supports the mirroring sink mode, on the basis of device information of the sink device 20 included in the P2P connection request or the RTSP connection request.

The source device 10 may determine that the content transmission condition is satisfied when the authentication for protection of the content succeeds.

The source device 10 may receive an encrypted first message from the sink device 20, and, when the first message is the same as a second message generated by the source device 10, may determine that the authentication for protection of the content succeeds. This is the same as described in FIG. 7.

When the sink device 20 supports the mirroring sink mode and the authentication for protection of the content succeeds, the source device 10 may determine that the content transmission condition is satisfied.

When the content transmission condition is satisfied, the source device 10 transmits content video data corresponding to a content image, and OSD video data to the sink device 20 (S811).

When it is determined that the content transmission condition is satisfied, the source device 10 may transmit, to the sink device 20, the content video data corresponding to the content image being displayed on the display 22 of the source device 10, and the OSD video data corresponding to an OSD image being displayed on the display 22.

The source device 10 may encrypt the content video data, and may transmit the encrypted content video data to the sink device 20.

The sink device 20 displays a mirroring image on the basis of the content video data received from the source device 10, and displays an OSD image on the basis of the OSD video data (S813).

The sink device 20 may decrypt the encrypted content video data received from the source device 10, and may display the mirroring image on the display 22 on the basis of the decrypted content video data.

At the same time, the sink device 20 may display the OSD image on the display 22 on the basis of the OSD video data.

The sink device 20 receives a request to select a specific item within the OSD image (S815), and transmits coordinates information of a selected point to the source device 10 (S817).

The OSD image may include a plurality of items. Each item may be an icon corresponding to a specific application or menu. The application may be any one of a CP application indicating a content provider, a web application for accessing a web site, an application for accessing a storage medium.

The application may be installed in the source device 10 or an external device connected with the source device 10. For example, when the source device 10 is a TV and the external device connected to the TV is a set-top box, the application may be an application that is installed in the set-top box.

The sink device 20 may receive a request to select a specific item through a user's touch input.

The sink device 20 may obtain coordinates information of a point where the touch input is received, and may transmit the obtained coordinates information to the source device 10.

A user input back channel (UIBC) service may refer to a service that controls an operation of the source device 10 through the sink device 20.

That is, the sink device 20 may transmit coordinates information of a point where a touch input is received to the source device 10 through a UIBC. The UIBC may be a channel for transmitting information regarding a user input received by the sink device 20 to the source device 10 on the basis of Wi-Fi Direct standards.

The source device 10 executes the specific item on the basis of the coordinates information received from the sink device (S819), and transmits image data indicating the result of executing the item to the sink device 20 (S821).

The source device 10 may determine any one of the plurality of items included in the OSD image as the selected item on the basis of the received coordinates information. The source device 10 may execute the determined item, and may transmit execution image data indicating the result of executing the item to the sink device 20.

The source device 10 may display an execution image indicating the result of executing the item. The source device 10 may transmit the execution image data to the sink device 20 when authentication for protection of a content regarding the execution image succeeds.

On the other hand, when the content transmission condition is not satisfied, the source device 10 transmits the OSD video data to the sink device 20 (S823).

The sink device 20 displays the OSD image on the basis of the OSD image data received from the source device 10 (S825).

Although a user does not view the content image being displayed by the source device 10 through the sink device 20, the user may control the source device 10 through the OSD image. The user may utilize a function that does not exist in the sink device 20 only by a touch input of selecting an item included in the OSD image.

According to an embodiment of the present disclosure, the user can view the content image being displayed by the source device 10 through the sink device 20, and can control the source device 10.

In addition, the user can easily control the source device 10 only by a simple touch input through the sink device 20, such that convenience can be greatly enhanced.

Figure 9:
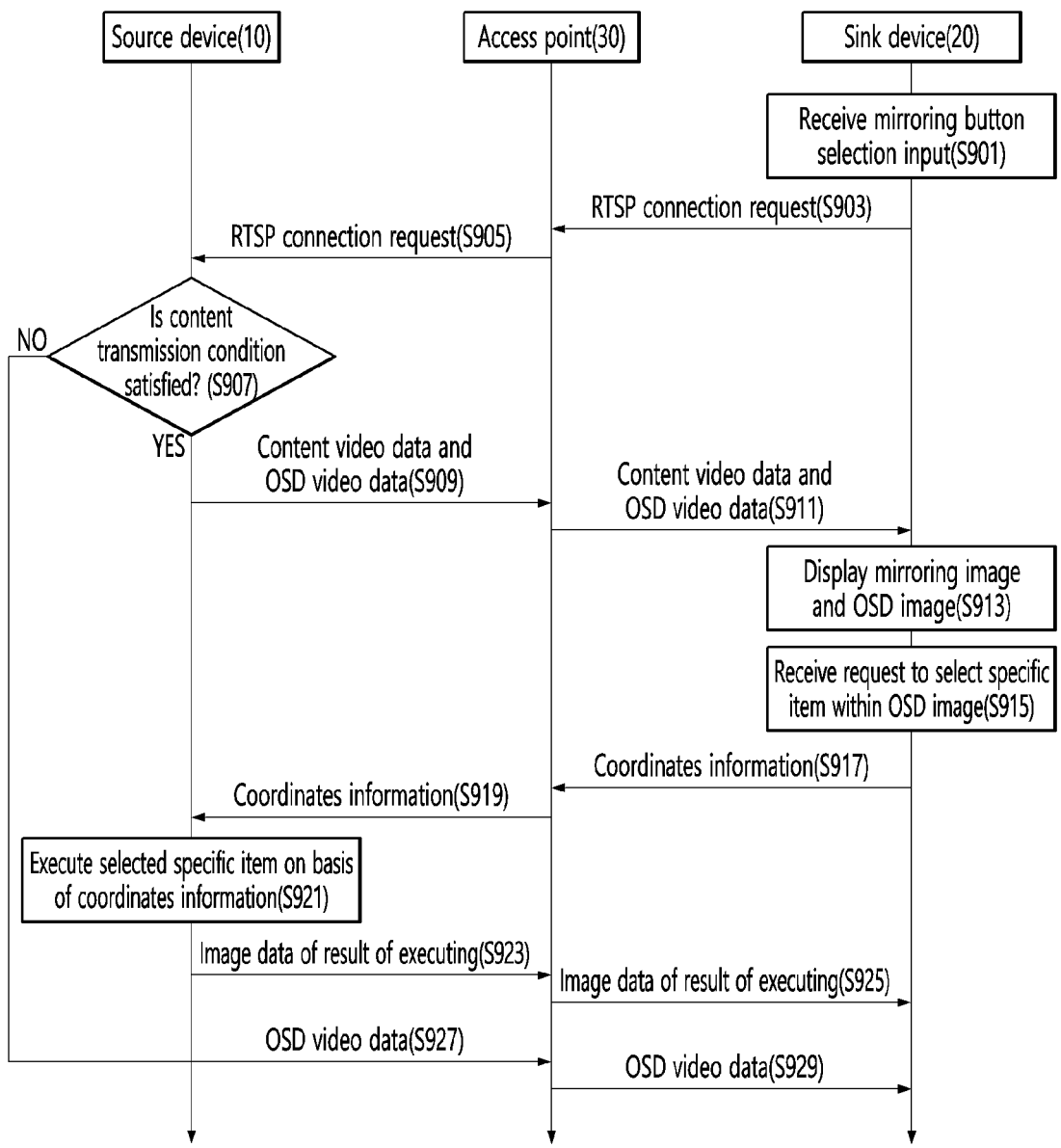
FIG. 9 is a view illustrating an example of providing a screen sharing service through an AP connection mode between the source device and the sink device according to an embodiment of the present disclosure.

FIG. 9 is a view to explain an example of providing a screen sharing service through an AP connection mode between the source device and the sink device according to an embodiment of the present disclosure.

In FIG. 9, it is assumed that the source device 10 and the sink device 20 are already connected to each other through an AP connection mode.

In addition, in FIG. 9, the sink device 20 may discover the source device 10 existing in the same network through a ThinkQ application for controlling an external device. The discovered source device and a mirroring button, which will be described below, may be displayed on an execution screen of the ThinkQ application.

The sink device 20 receives a mirroring button selection input (S901).

The mirroring button may be a button that is displayed on the display 22 of the sink device 20 to provide a screen mirroring service.

The sink device 20 transmits an RTSP connection request to the access point 30 in response to the mirroring button selection input (S903).

The access point 30 transmits the RTSP connection request received from the sink device 20 to the source device 10 (S905).

The source device 10 determines whether a content transmission condition is satisfied (S907).

In an embodiment, the content transmission condition may include one or more of a condition where the sink device 20 supports the mirroring sink mode, and a condition where authentication for protection of a content being displayed by the source device 10 succeeds.

When the sink device 20 supports the mirroring sink mode, the source device 10 may determine that the content transmission condition is satisfied.

The source device 10 may determine whether the sink device 20 supports the mirroring sink mode, on the basis of device information of the sink device 20 included in the RTSP connection request.

When the authentication for protection of the content succeeds, the source device 10 may determine that the content transmission condition is satisfied.

The source device 10 may receive an encrypted first message from the sink device 20, and, when the first message is the same as a second message generated by the source device 10, the source device 10 may determine that the authentication for protection of the content succeeds. This is the same as described in FIG. 7.

When the sink device 20 supports the mirroring sink mode and the authentication for protection of the content succeeds, the source device 10 may determine that the content transmission condition is satisfied.

When the content transmission condition is satisfied, the source device 10 transmits content video data corresponding to a content image, and OSD video data to the access point 30 (S909), and the access point 30 delivers the content video data and the OSD video data to the sink device 20 (S911).

When it is determined that the content transmission condition is satisfied, the source device 10 may transmit, to the sink device 20 through the access point 30, the content video data corresponding to the content image being displayed on the display 22 of the source device 10, and the OSD video data corresponding to an OSD image being displayed on the display 22.

The source device 10 may encrypt the content video data, and may transmit the encrypted content video data to the sink device 20 through the access point 30.

The sink device 20 displays a mirroring image on the basis of the content video data received from the access point 30, and may display an OSD image on the basis of the OSD video data (S913).

The sink device 20 may decrypt the encrypted content video data received from the access point 30, and may display the mirroring image on the display 22 on the basis of the decrypted content video data.

At the same time, the sink device 20 may display the OSD image on the display 22 on the basis of the OSD video data.

The sink device 20 receives a request to select a specific item within the OSD image (S915), and transmits coordinates information of a selected point to the access point 30 (S917).

The sink device 20 may receive a request to select a specific item through a user's touch input.

The sink device 20 may obtain coordinates information of a point where the touch input is received, and may transmit the obtained coordinates information to the source device 10 through the access point 30.

The sink device 20 may transmit coordinates information of a point where a touch input is received to the source device 10 through a UIBC.

The access point 30 delivers the received coordinates information to the source device 10 (S919).

The source device 10 executes the specific item on the basis of the coordinates information received from the access point (S921), and transmits image data indicating the result of executing the item to the access point 30 (S923).

The source device 10 may determine any one of the plurality of items included in the OSD image as the selected item, on the basis of the received coordinates information. The source device 10 may execute the determined item, and may transmit execution image data indicating the result of executing the item to the sink device 20 through the access point 30.

The source device 10 may display an execution image indicating the result of executing the item. When authentication for protection of a content regarding the execution image succeeds, the source device 10 may transmit the execution image data to the sink device 20 through the access point 30.

The access point 30 delivers the image data of the result of executing which is received from the source device 10 to the sink device 20 (S925).

On the other hand, when the content transmission condition is not satisfied, the source device 10 transmits the OSD video data to the access point 30 (S927), and the access point 30 delivers the received OSD video data to the sink device 20 (S929).

Although the user does not view the content image being displayed by the source device 10 through the sink device 20, the user may control the source device 10 through the OSD image. The user may utilize a function that does not exist in the sink device 20 only by a touch input of selecting an item included in the OSD image.

According to an embodiment of the present disclosure, the user can view the content image being displayed by the source device 10 through the sink device 20, and can control the source device 10.

In addition, the user can easily control the source device 10 only by a simple touch input through the sink device 20, such that convenience can be greatly enhanced.

Figure 10:
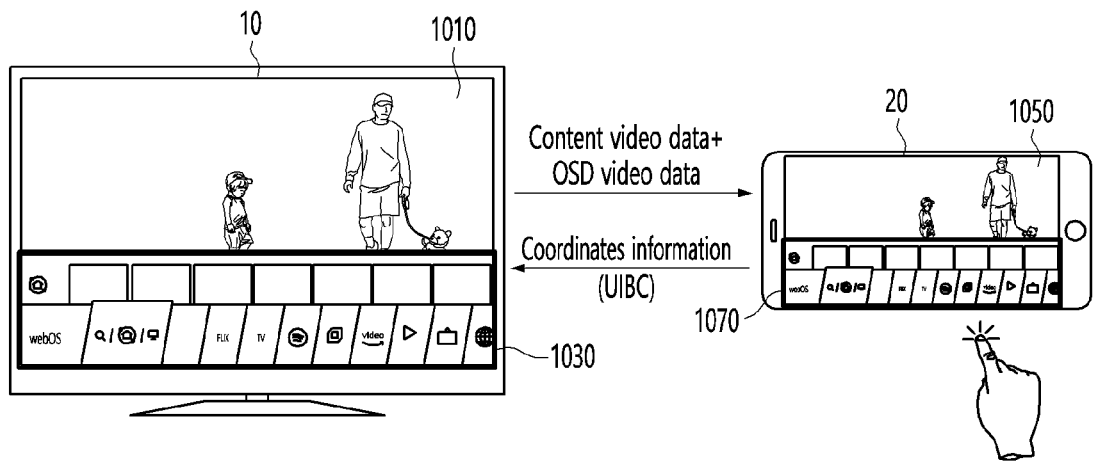
FIGS. 10 and 11 are views to explain data transmitted between the source device and the sink device according to whether a content transmission condition is satisfied.
Figure 11:
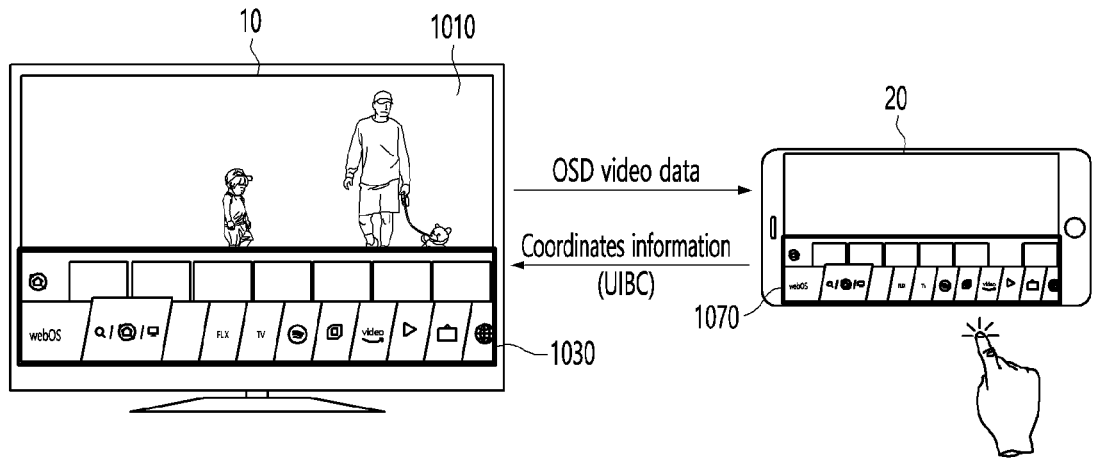

FIGS. 10 and 11 are views to explain data delivered between the source device and the sink device according to whether a content transmission condition is satisfied.

In FIGS. 10 and 11, the source device 10 may be a TV and the sink device 20 may be a mobile terminal of a user.

FIG. 10 illustrates an example of a case where a content transmission condition (one or more of a condition where the sink device is in a mirroring sink mode, or a condition where authentication for content protection succeeds) is satisfied, and FIG. 11 illustrates an example of a case where the content transmission condition is not satisfied.

The embodiment of FIGS. 10 and 11 illustrates that the source device 10 and the sink device 20 provide data using a screen sharing service through a P2P connection mode, but this is merely an example and the embodiment may be applied to a case where a connection is made through an AP connection mode.

However, in the case of the AP connection mode, the access point 30 may be added as an intermediary of data delivery. This is the same as described in FIG. 9.

Referring to FIG. 10, the source device 10 displays a content image 1010 and an OSD image 1030.

When the content transmission condition is satisfied, the source device 10 may transmit content image data corresponding to the content image 1010 and OSD image data corresponding to the OSD image 1030 to the sink device 20.

The sink device 20 may display a content mirroring image 1050 on the basis of the content image data, and may display an OSD mirroring image 1070 on the basis of the OSD image data.

The sink device 20 may receive a touch input of selecting a specific item from among a plurality of items included in the OSD mirroring image 1070.

The sink device 20 may obtain coordinates information of a position where the touch input is received, and may transmit the obtained coordinates information to the source device 10 through a UIBC.

The source device 10 may select an item positioned at a point corresponding to the corresponding coordinates information, on the basis of the received coordinates information, and may execute the selected item.

The user can control an operation of the source device 10, while viewing the content image being displayed by the source device 10 through the sink device 20.

FIG. 11 will be described hereinbelow.

Referring to FIG. 11, the source device 10 may display the content image 1010 and the OSD image 1030.

When the content transmission condition is not satisfied, the source device 10 may transmit only the OSD image data corresponding to the OSD image 1030 to the sink device 20.

The sink device 20 may display the OSD mirroring image 1070 on the basis of the OSD image data.

The sink device 20 may display a black image on an area other than the area where the OSD mirroring image 1070 is displayed.

The sink device 20 may obtain coordinates information of a position where a touch input is received, and may transmit the obtained coordinates information to the source device 10 through the UIBC.

The source device 10 may select an item positioned at a point corresponding to the corresponding coordinates information on the basis of the received coordinates information, and may execute the selected item.

The user can control an operation of the source device although the user does not view the content image being displayed by the source device 10 through the sink device 20.

According to an embodiment of the present disclosure, the above-described method can be implemented as a processor-readable code on a medium on which a program is recorded. Examples of the processor-readable medium include ROMs, RAMs, CD-ROMs, magnetic tapes, floppy disks, and optical data storage devices.

The display device described above is not limited to the configuration and method of the above-described embodiments, all or some of the above-described embodiments may be selectively combined so that various modifications may be made.

What is claimed is:

1. A wireless device comprising:
a display configured to display a content image and an On Screen Display (OSD) image including a plurality of items corresponding to a plurality of applications installed in the wireless device;
a wireless communication interface configured to communicate with an external device wirelessly; and
a processor configured to:
receive a mirroring request for a screen sharing service from the external device,
determine whether a transmission condition of the content image is satisfied according to the received mirroring request,
based on determining that the transmission condition is satisfied, transmit content image data corresponding to the content image and OSD image data corresponding to the OSD image to the external device through the wireless communication interface, and
based on determining that the transmission condition is not satisfied, transmit the OSD image data corresponding to the OSD image to the external device through the wireless communication interface,
wherein the processor is further configured to:
receive coordinate information from the external device;
select an item existing at a point corresponding to the coordinate information from the plurality of items; and
execute an application of the plurality of applications that corresponds to the selected item.

2. The wireless device of claim 1, wherein the processor is further configured to determine that the transmission condition is satisfied when the external device supports a mirroring sink mode in which the external device receives and displays a displayed image.

3. The wireless device of claim 1, wherein the processor is further configured to determine that the transmission condition is satisfied when authentication for content protection of the content image succeeds.

4. The wireless device of claim 3, wherein the processor is further configured to determine that the authentication for the content protection succeeds when a first message received from the external device is same as a second message generated by the wireless device,
wherein the first message is a message that is generated based on a public key of the external device, a public key of the wireless device, and a private key of the external device, and
wherein the second message is a message that is generated based on the public key of the external device, the public key of the wireless device, and a private key of the wireless device.

5. The wireless device of claim 1, wherein the processor is further configured to determine that the transmission condition is satisfied when the external device supports a mirroring sink mode in which the external device receives and displays a displayed image, and authentication for content protection of the content image succeeds.

6. The wireless device of claim 1, wherein the processor is further configured to receive the coordinate information through a User Input Back Channel (UIBC).

7. The wireless device of claim 1, wherein the processor is further configured to provide the screen sharing service in any one connection mode of a first connection mode where the wireless device is connected with the external device through a router, or a second connection mode where the wireless device is directly connected with the external device without the router.

8. A wireless device comprising:
a display;
a wireless communication interface configured to wirelessly communicate with an external device which displays a content image and an On Screen Display (OSD) image including a plurality of items corresponding to a plurality of applications installed in the external device; and
a processor configured to:
transmit a mirroring request for a screen sharing service to the external device,
determine whether a transmission condition of the content image is satisfied,
based on determining that the transmission condition is satisfied:
receive content image data corresponding to the content image and OSD image data corresponding to the OSD image from the external device through the wireless communication interface, and
display a content mirroring image based on the content image data and display an OSD mirroring image based on the OSD image data on the display, and
based on determining that the transmission condition is not satisfied:
receive the OSD image data corresponding to the OSD image from the external device through the wireless communication interface, and
display the OSD mirroring image based on the OSD image data,
wherein the processor is further configured to:
receive a user input of selecting one of the plurality of items, and
transmit coordinate information of a point where the user input is received to the external device.

9. The wireless device of claim 8, wherein the processor is further configured to determine that the transmission condition is satisfied when the external device supports a mirroring sink mode in which the external device receives and displays an image displayed by the external device.

10. The wireless device of claim 8, wherein the processor is further configured to determine that the transmission condition is satisfied when authentication for content protection of the content image succeeds.

11. The wireless device of claim 10, wherein the processor is further configured to determine that the authentication for the content protection succeeds when a first message received from the external device is same as a second message generated by the wireless device,
wherein the first message is a message that is generated based on a public key of the external device, a public key of the wireless device, and a private key of the external device, and
wherein the second message is a message that is generated based on the public key of the external device, the public key of the wireless device, and a private key of the wireless device.

12. The wireless device of claim 8, wherein the processor is further configured to determine that the transmission condition is satisfied when the external device supports a mirroring sink mode in which the external device receives and displays an image displayed by the external device, and authentication for content protection of the content image succeeds.

13. The wireless device of claim 8, wherein the processor is configured to transmit the coordinate information to the external device through a User Input Back Channel (UIBC).

14. The wireless device of claim 8, wherein the processor is further configured to provide the screen sharing service in any one connection mode of a first connection mode where the wireless device is connected with the external device through a router, or a second connection mode where the wireless device is directly connected with the external device without the router.

* * * * *